United States Patent Office 3,138,520
Patented June 23, 1964

---

3,138,520
FORMALDEHYDE COMPOSITIONS
Harry H. Pugh, Chicago, Ill., assignor to Gillette Inhibitor Co., Chicago, Ill., a corporation of Illinois
No Drawing. Filed Dec. 29, 1958, Ser. No. 783,170
5 Claims. (Cl. 167—26)

My invention relates to new and useful formaldehyde compositions.

Formaldehyde is commonly produced and sold commerically in the form of aqueous solutions containing about 37% formaldehyde and, in certain cases, in higher concentrations, for instance, 44% formaldehyde, as well as in the solid polymer form of paraformaldehyde. While such formaldehyde products have a wide variety of uses, one general field of utility lies in agriculture. Here the uses include, among others, treatment for the control of plant diseases. One of the disadvantages of the use of formaldehyde, in these environments, is that it not infrequently exhibits phytotoxicity.

I have evolved new and useful formaldehyde compositions which have marked utility particularly in the field of treatment of seeds and the treatment of plants for the control of diseases but which, in addition, can be used for various other purposes for which formaldehyde is known to be useful as, for instance, for preserving and protectant purposes. By way of example, formaldehyde compositions made in accordance with the present invention are effective in the control of onion diseases such as onion smut, wheat smuts, plant tuber or potato tuber diseases and sweet potato diseases; for the treatment of food plants in their seedling stages; for preventing mildew in roses; for soil disinfecting; for treatment of mastitis of cows, and the like.

In accordance with my present invention, an acrylic polymer emulsion is admixed with ammonia in an amount sufficient to convert the emulsion to a solution, the term "solution," as used herein, including not only true solutions but also colloidal solutions, and then is mixed with an appropriate amount of formaldehyde. If desired, prior or subsequent to the admixture of the acrylic polymer emuslion with the ammonia, water may be added to produce a more dilute and less viscous product. The addition of the ammonia to the acrylic polymer emulsion causes an exothermic action and it may be desirable, therefore, to carry out said step under conditions wherein the mixture is cooled. It has been found that resulting finished compositions, although containing substantial proportions of ammonia, are relatively free of the odor of ammonia. Furthermore, the formaldehyde in such compositions appears, in some manner, to be trapped in the composition and it does not readily volatilize therefrom. These results appear to be due to a coaction among the several ingredients, to wit, the acrylic polymer emulsion, the ammonia, and the formaldehyde, the exact chemical nature of which coaction is not fully known. At any rate, the compositions possess the advantage not only of being relatively free from the odor of ammonia but, in addition, the formaldehyde appears to be available for longer periods of time so that, in use, the protection afforded by the content of formaldehyde is substantially prolonged over the protection which has heretofore been afforded by formaldehyde in the compositions in which it has previously been used, as, for instance, conventional aqueous solutions thereof.

The ammonia content serves a number of purposes in the composition of the present invention. Apart from its conversion of the acrylic polymer emulsion to a solution, a step which, per se, is known, the ammonia also serves as a source of food for plants treated with the compositions of the present invention, without causing burning of the plants, and it appears, in combination with the other ingredients of the compositions, to bring about antishock or protective action on plants which is not characteristic of various plant disinfectants and protectants heretofore known and used in the art.

The compositions of the present invention can be used with good effect on edible vegetation, can readily be sprayed on plants, and can be used, as indicated above, as a soil drench as well as for the treatment of seeds. Furthermore, for obtaining particular bactericidal or fungicidal or insecticidal effects, various agents possessing such properties and characteristics can be admixed therewith as, for instance, organic toxicants such as aldrin, dieldrin, toxaphene, heptachlor, methoxychlor, and various other agents of such types.

The acrylic polymer emulsions, which constitute one of the starting materials used in the preparation of the compositions of this invention, are commercial articles of commerce. They may be purchased in the form of dry compositions which, when admixed with water, produce the emulsions or they may be purchased as liquid emulsions containing, for instance, of the order of 35% to 50%, by weight, of the acrylic polymer solids. It will be understood, in this connection, that the term "polymer" is used generically to include copolymers so that the present invention contemplates the utilization of acrylic polymers and acrylic copolymers, in emulsion form, for admixture with ammonia and formaldehyde as described above. In general, while the present invention contemplates the utilization of any of the acrylic polymer emulsion, it is particularly desirable to utilize those acrylic polymer emulsions in which the acrylic polymer is a polymethylmethacrylate or a polyethylmethacrylate. Polybutylmethacrylate, methacrylamide polymers, methacrylic acid polymers, and mixtures of various acrylic polymers which may be made, for example, by admixing acrylic monomers of various types and polymerizing or copolymerizing them and preparing the final acrylic polymer compositions in emulsion form, can be utilized. My invention may be practiced with particularly good results utilizing such commercial acrylic polymer emulsions as those which are sold under the trade names Rhoplex ASE Base 75, Rhoplex AC–33, Acrysol ASE–60, and Acrysol ASE–75, said products being sold by the Resinous Products Division of Rohm & Haas Company. Rhoplex ASE Base 75, for example, contains approximately 46% of the acrylic polymer, by weight, and the same is true with respect to Rhoplex AC–33; and Acrysol ASE–75 contains approximately 40% of acrylic polymer solids.

The amount of ammonia used in the compositions of the invention may vary somewhat but, in general, the amount of ammonia which is sufficient at least to convert the acrylic emulsion to a solution. Generally speaking the pH of the resulting solution should be in the range of about 10 to about 11.5 Ordinarily, the pH, after the addition of the ammonia to convert the acrylic polymer emulsion to a solution, will be of the order of 9 or somewhat over 9 and the pH can then be raised or lowered, as desired, provided, however, that the composition as a whole has a pH over 7 and that it be in the form of a solution. The ammonia can be added in any desired form but it is advantageous to employ it in the form of concentrated solutions containing of the order of 26 to 28% ammonia.

The formaldehyde which is embodied in the compositions, made as described above, is advantageously employed in the form of relatively strong aqueous solutions, as, for instance, from about 35 or 37% up to about 45% or even higher. In certain instances, it is advantageous, in preparing the compositons of my invention, to pass gaseous formaldehyde into the ammoniated acrylic polymer solution until the desired concentration of formaldehyde is obtained.

The proportions of the ingredients of the compositions of my invention are variable within relatively wide limits. Thus, for example, excellent results are obtained through the utilization of from 4 to 8 parts of an acrylic polymer emulsion containing from 35% to 50% by weight of solids, from 10 to 50 parts of concentrated aqueous ammonia or 28% aqueous ammonia to convert said emulsion to a solution, and from 6 to 65 parts of formaldehyde, all of said parts being by weight. The water content is variable, depending upon whether the composition is in the form of a concentrate or whether it is diluted for end use and, of course, the extent of dilution can be varied depending upon the end use.

The following examples are illustrative of compositions made in accordance with my present invention. It will be understood, as previously indicated, that the proportions may be varied without in any manner departing from the principles of the invention and it will also be understood that said examples are in no way intended to be limitative of the full scope of the invention.

*Example 1*

| | |
|---|---|
| Acrylic emulsion (Rhoplex ASE Base 75, 46% solids) | 4 |
| Formalin (44% formaldehyde) | 16 |
| Ammonia (28% $NH_3$) | 12.5 |
| Water | 93.5 |

In use, 1 part of the composition of Example 1 is conveniently admixed with 12.5 parts of water to produce a composition containing about 1% of a 37½% solution of formaldehyde equivalent and, in this form, the composition is highly effective as a spray for plant life for fungicidal, bactericidal or protectant effects.

*Example 2*

| | |
|---|---|
| Acrylic emulsion (Rhoplex ASE Base 75, 46% solids) | 6 |
| Formalin (44% formaldehyde) | 34.5 |
| Ammonia (28% $NH_3$) | 25.5 |
| Water | 62 |

*Example 3*

| | |
|---|---|
| Acrylic emulsion (Rhoplex ASE Base 75, 46% solids) | 8 |
| Formalin (44% formaldehyde) | 69 |
| Ammonia (28% $NH_3$) | 51 |
| Water | 60 |

The compositions of the present invention, in use in agriculture, have the advantage of being completely or substantially completely transparent, they produce film thicknesses of a low order thus bringing about substantial savings in cost, they do not prevent the growth nor the breathing of the foliage and they do not hinder photosynthesis. From the mechanical standpoint, they do not clog up the orifices of spray equipment, if such equipment is used in distributing the compositions over the plants or like surfaces, and, because there is relatively little or no settling out even on standing over periods of several hours, little or no agitation is required in the spray tank or like equipment.

As has been pointed out above, the compositions of my invention may be admixed with various known toxicant materials. Thus, for instance, malathion, in the form of the 95% technical grade, can be admixed with the compositions of my invention, together with a suitable emulsifier, for instance, Span 80, to produce compositions in which recommended concentrations of malathion are present so that the compositions are effective in the treatment of plant diseases for which malathion is indicated and without harmful effects so far as phytotoxicity is concerned. Again, in another illustrative case, dieldrin can be dissolved in xylene and added to compositions made in accordance with my invention, in conjunction with known suitable emulsifying agents, to produce final products, after dilution with water, which are highly effective for the treatment of insects which are susceptible to destruction by dieldrin. Another type of fungicide which may most effectively be incorporated into the compositions of my invention is solubilized phenylmercuric acetate. Solubilized phenylmercuric acetate products can be made, for example, in accordance with Reissue Patent No. 23,863. In blending the solubilized phenylmercuric acetate solutions, for instance, 30% active solutions in which the mercury content as metal is about 18%, into the compositions of my invention, it is advantageous to admix such phenylmercuric acetate solutions with aqueous ammonia and then add the same to the previously prepared solutions comprising ammoniated acrylic polymer emulsions. The final compositions, which are in the form of concentrates, can be diluted down with water to produce a concentration of 1 part of phenylmercuric acetate in, say, 200,000 parts of composition and, when used in this form, the said compositions have excellent fungicidal effect against the many types of fungi which are susceptible to treatment with organic mercurials such as phenylmercuric acetate.

While, as pointed out above, the compositions of my invention have particular utility in the field of agriculture, they also have marked advantages for a number of other purposes. Thus, for instance, they can be used, in desired diluted form, for the sterilization of cuts, scratches and upon wounds, for the treatment of skin conditions such as teen-age acne, rashes, an athlete's foot, and for the sterilization of surgical instruments. The burning sensations normally characteristic of formaldehyde are markedly reduced with the compositions of my invention and, because of this fact, it is possible to use higher concentrations of formaldehyde with the advantages attendant thereon while, at the same time, avoiding the objections due to skin irritation, astringency and odor. Other uses of the compositions are treatment of viruses; for the treatment of sewage; in admixture with alkaline detergent and cleaning compounds, especially those having a high pH, for cleansers used in laboratories to maintain surface sterility, my compositions being compatible therewith; and for the preservation of glue and other adhesives. Compositions made by diluting the produce of Example 1 with water, on the basis of 1 to 5000, have shown killing affect on Staphylococcus and Pneumonoccus on 24 hour culture being several-fold more effective than heretofore known and commercially sold quaternary ammonium bactericidal agents.

While the invention has been described in detail, it will be understood that no unnecessary limitations should be imported thereinto.

What I claim as new and desire to protect by Letters Patent of the United States is:

1. Formaldehyde composition in the form of aqueous solutions comprising formaldehyde, ammonia, acrylic polymer emulsion solids, and water.

2. Formaldehyde composition in the form of aqueous solutions comprising the following ingredients in substantially the following parts by weight to each other:

| | |
|---|---|
| Acrylic polymer emulsion (containing from 35 to 50% by weight of solids) | 4 to 8 |
| Concentrated aqueous ammonia | 10 to 50 |
| Formaldehyde | 6 to 65 |

3. Formaldehyde composition in the form of aqueous solutions comprising the following ingredients in substantially the following parts by weight to each other:

| | |
|---|---|
| Acrylic polymer emulsion (containing from 40 to 50% by weight of solids) | 4 to 8 |
| Aqueous ammonia (28%) | 10 to 50 |
| Formaldehyde | 6 to 65 |

4. A method of producing formaldehyde compositions in the form of aqueous solutions which comprises admixing an acrylic polymer emulsion with ammonia to convert the same to a solution, and then admixing formaldehyde therewith.

5. A method of producing formaldehyde compositions in the form of aqueous solutions which comprises admixing from 4 to 8 parts of an acrylic polymer emulsion containing from 35 to 50% by weight of solids with from 10 to 50 parts of concentrated aqueous ammonia to convert said emulsion to a solution, and then admixing therewith from 6 to 65 parts of aqueous formaldehyde containing from 35 to 45% by weight of formaldehyde, said parts being by weight.

References Cited in the file of this patent

UNITED STATES PATENTS

| | | |
|---|---|---|
| 1,265,463 | McCarthy | May 7, 1918 |
| 1,976,679 | Fikentscher et al. | Oct. 9, 1934 |
| 2,042,657 | Hinegardner | June 2, 1936 |
| 2,332,901 | D'Alelio | Oct. 26, 1943 |
| 2,679,494 | Thomas | May 25, 1954 |

OTHER REFERENCES

De Navarre: International Encyclopedia of Cosmetic Material Trade Names, Moore Publ. Co., New York (1957), pp. 310–311, 324.